(12) United States Patent
Sakai et al.

(10) Patent No.: US 8,295,297 B2
(45) Date of Patent: Oct. 23, 2012

(54) TRANSMITTING SYSTEM AND TRANSMITTING DEVICE

(75) Inventors: Koji Sakai, Osaka (JP); Hitoshi Naoe, Nara (JP); Kota Tanaka, Kyoto (JP)

(73) Assignee: Sharp Kabushiki Kaisha, Osaka-Shi Osaka (JP)

( * ) Notice: Subject to any disclaimer, the term of this patent is extended or adjusted under 35 U.S.C. 154(b) by 202 days.

(21) Appl. No.: 12/116,377

(22) Filed: May 7, 2008

(65) Prior Publication Data

US 2008/0279561 A1    Nov. 13, 2008

(30) Foreign Application Priority Data

May 10, 2007  (JP) ................................. 2007-126098

(51) Int. Cl.
*H04L 12/28* (2006.01)
*H04N 7/16* (2011.01)
(52) U.S. Cl. ......... 370/419; 725/141; 725/149; 725/153
(58) Field of Classification Search .................. None
See application file for complete search history.

(56) References Cited

U.S. PATENT DOCUMENTS

| | | | |
|---|---|---|---|
| 2003/0210337 A1* | 11/2003 | Hall .......................... | 348/231.99 |
| 2006/0117115 A1 | 6/2006 | Jo et al. | |
| 2006/0117346 A1* | 6/2006 | Jo et al. ........................... | 725/38 |
| 2009/0017884 A1* | 1/2009 | Rotschild ................... | 455/575.8 |

FOREIGN PATENT DOCUMENTS

| | | |
|---|---|---|
| CN | 1783943 A | 6/2006 |
| JP | 2-285445 A | 11/1990 |

OTHER PUBLICATIONS

Naoe et al., "Standardization of IrSimple, a High-Speed Infrared Communications Protocol," SHARP Technical Journal, Feb. 2007, vol. 95, pp. 63-68.
Naoe et al., "IrDA Serial Infrared Link Access Protocol Specification for IrSimple Addition," Version 1.00, Oct. 14, 2005, pp. 1-65.
Naoe et al., "IrDA Serial Infrared Link Management Protocol Specification for IrSimple Addition," Version 1.00, Oct. 14, 2005, pp. 1-27.
Naoe et al., "IrDA Serial Infrared Sequence Management Protocol for IrSimple, Version 1.00, Oct. 14, 2005, pp. 1-63.
Megowan et al., "Infrared Data Association® (IrDA® ) Object Exchange Protocol OBEX™," Extended Systems, Inc Microsoft Corporation, Version 1.3. Jan. 3, 2003, pp. 1-95.

* cited by examiner

*Primary Examiner* — Ayaz Sheikh
*Assistant Examiner* — Sori Aga
(74) *Attorney, Agent, or Firm* — Birch, Stewart, Kolasch & Birch, LLP

(57) ABSTRACT

Protocol conversion based on a communication protocol and data modulation based on a communication method are performed, in advance, on desired transmission data by a host device, which is an external device. Then, the converted data will be written to a memory in a transmitting device. According to a transmission command from an input section, a logical device reads out the converted data stored in the memory, and then outputs the read data from a transmitting section.

8 Claims, 15 Drawing Sheets

TRANSMITTING SYSTEM AND TRANSMITTING DEVICE

This Nonprovisional application claims priority under 35 U.S.C. §119(a) on Patent Application No. 126098/2007 filed in Japan on May 10, 2007, the entire contents of which are hereby incorporated by reference.

FIELD OF THE INVENTION

The present invention relates to a transmitting system for performing data communication by using a one-way communication method without the need for data for a communication check from a communication recipient.

BACKGROUND OF THE INVENTION

In recent years, an infrared communication function is used for many devices. The infrared communication standards include an IrDA-D1.1 protocol (Infrared Data Association-Data ver1.1, hereafter referred to as IrDA protocol) and an IrSimple protocol, which was prescribed by IrDA in 2005 as a new communication standard (see page 63 to 68 on SHARP Technical Journal Vol. 95, February 2007).

Because the IrSimple protocol needs less time for connection and has much higher communication efficiency than a conventional IrDA protocol, the IrSimple protocol can reduce the time necessary for performing data communication of a certain size approximately by one-forth to one-tenth. In addition, the IrSimple protocol has two types of communication methods, that is, one-way communication and two-way communication, and can switch between the two depending on the purpose.

By using a device adopting the IrSimple protocol, for example, the following is possible: After a user takes a photo by using a cellular phone or a digital camera, the user can instantly transmit the photo to a television or a photo printer by operation as simple as a remote controller's operation. Thus, the IrSimple protocol is expected to be adopted in more applications as a new communication method.

The following explains an arrangement of a conventional transmitting device such as a portable terminal (such as a cellular phone, a PDA and the like); a digital camera; and the like, each of which corresponds to the infrared communication function using the IrSimple protocol. FIG. 12 is a block diagram schematically illustrating an arrangement of a conventional transmitting device.

A transmitting device 100 in FIG. 12 comprises a CPU 101, a communication controller 102, a transmitting section 103, a memory 104, a memory interface 105, an input section 106, and a ROM 107.

The CPU 101 is a means for controlling the transmitting device 100 by reading a control program (such as a protocol stack) from the ROM 107, and executing the control program. When the CPU 101 detects a transmission command from the input section 106, the CPU 101 reads out desired transmission data stored in the memory 104, converts the read data into the data compatible with the communication protocol, and requests the communication controller 102 to transmit the data.

When the communication controller 102 receives the transmission request from the CPU 101, the communication controller 102, based on the communication method, performs the data modulation on the protocol-converted data (the data converted to be compatible with the communication protocol). Then, the communication controller 102 outputs the modulated data to the transmitting section 103.

The transmitting section 103 is a means for transmitting the data which is outputted from the communication controller 102. For example, when infrared rays are used as a communication medium, the transmitting section 103 will be an LED (Light Emitting Diode) or an LD (Laser Diode), however, it is not limited to them. When other communication media are used, the transmitting section 103 will be the one which is suitable for the medium.

The memory 104 stores the data to be transmitted. The memory 104 may be a volatile memory (such as an SDRAM or the like) or a nonvolatile memory (such as a flash memory, an HDD, a DVD or the like). In FIG. 12, the memory 104 is positioned inside the transmitting device, but the memory 104 should not necessarily be inside the transmitting device. The memory 104 may be connected to the transmitting device as an external memory of the transmitting device.

The memory interface 105 has an interface function to the memory 104. For example, the memory interface 105 has an interface function for a USB, a memory card or the like. Through the memory interface 105, a user writes desired transmission data to the memory 104. The input section 106 is, for example, a transmission button or the like installed on the transmitting device 100. When the user presses the transmission button, the press of the button is detected and a transmission command is outputted to the CPU 101. The ROM 107 is a read-only program memory and stores a control program such as a protocol stack.

In the transmitting device 100 arranged as above, the CPU 101 and the communication controller 102 may be integrated into an application processor, thereby being one LSI.

Next, the following explains transmission procedures in the transmitting device 100. Firstly, the user requests from the input section 106 to transmit desired transmission data, for example, by pressing the transmission button. When the CPU 101 in the transmitting device detects the transmission request from the input section 106, the CPU 101 performs protocol conversion of the desired transmission data stored in the memory 104 which is in the transmitting device or is connected externally to the transmitting device. Thereby, the desired transmission data becomes compatible with the communication protocol. On the data whose protocol has been converted to be compatible with the communication protocol, the data modulation is performed by the communication controller 102 based on the communication method which the transmitting device adopts. Then, the transmission data is transmitted from the transmitting section 103.

As described above, in the conventional transmitting device 100, the CPU 101 performs the protocol conversion on the transmission data based on the communication protocols such as the IrSimple protocol. Then, based on the data modulating method which is compatible with the communication method such as the IrSimple communication method, the communication controller 102 modulates the transmission data whose protocol has been converted.

Next, a conversion sequence for transmission data in the conventional transmitting device is described below in reference to FIG. 13.

In the conventional transmitting device, desired transmission data (i.e., a transmission file) such as image data, text data and the like is normally written from an external device through the USB or memory card interface to the memory which is in the transmitting device or is connected externally to the transmitting device. When a transmission request from the user is received, on the transmission data which has been written to the memory, the protocol conversion is performed by the CPU, so that the transmission data is converted to be compatible with the communication protocol. The transmission data whose protocol has been converted is modulated by the communication controller based on the communication method. Then, the transmission data is transmitted from the transmitting section.

Other conventional technologies according to the present invention are as follows:

Japanese Unexamined Patent Application Publication, Tokukaihei, No. 2-285445 (published on Nov. 22, 1990)

IrDA Serial Infrared Link Access Protocol Specification for IrSimple Addition Version 1.0 (Oct. 14, 2005)

IrDA Serial Infrared Link Management Protocol Specification for IrSimple Addition Version 1.0 (Oct. 14, 2005)

IrDA Serial Infrared Sequence Management Protocol for IrSimple Version 1.0 (Oct. 14, 2005)

Infrared Data Association Object Exchange Protocol Version 1.3 (Jan. 3, 2003)

As described above, in the conventional transmitting devices such as: the portable terminal such as the cellular phone, the PDA and the like; the digital camera; and the like, the CPU and the communication controller in the transmitting device must perform the protocol conversion based on the communication protocol and the data modulation based on the communication method on desired transmission data. Therefore, the CPU and the communication controller are essential for the conventional transmitting devices.

That is, the CPU and the communication controller are essential even for a functionally-very-simple transmitting device (such as: a presentation data transmitting tool; a transmitting device for checking the operation of the receiving device which corresponds to the IrSimple; and the like, each of whose communication function can perform only the IrSimple one-way communication) that does not need to receive the data for the communication check from the communication recipient and that transmits the data stored in the memory located in the transmitting device. Therefore, there is a problem that the cost of the transmitting devices is very high.

SUMMARY OF THE INVENTION

In view of the aforementioned problems, an object of the present invention is to provide a transmitting system for performing data communication by using the one-way communication method at low cost.

In order to attain the object, a transmitting system according to the present invention comprises a host device and a transmitting device, for transmitting data stored in the host device via the transmitting device to a receiving device by using a one-way communication method, the transmitting device comprising: a memory to which desired transmission data is written from the host device; a logical device for reading the data out of the memory and outputting the read data to a transmitting section so as to transmit, to the receiving device, the transmission data stored in the memory; and the transmitting section for transmitting the data read from the memory to the receiving device, wherein on the transmission data to be written to the memory in the transmitting device, the host device performs protocol conversion based on a one-way communication protocol and data modulation based on a communication method according to the communication protocol.

In this arrangement, the desired transmission data such as image data, text data and the like is converted, in advance, by the host device, which is an external device such as a PC or the like. For the desired transmission data, the protocol conversion is performed based on the communication protocol with which the transmitting device is compatible. Then, on the transmission data on which the communication protocol conversion has been done, the data modulation is performed based on the communication method.

The transmission data on which the protocol conversion and the data modulation have been done by the host device is written to the memory in the transmitting device. When a transmission command is inputted by a user, the transmission data which is written to the memory is read out from the memory by the logical device in the transmitting device, and then the transmission data is outputted from the transmitting section directly.

Thus, the transmitting system does not need a CPU for performing the protocol conversion or a communication controller for performing the data modulation, thereby making it possible to provide a transmitting device for the one-way communication at low cost.

Additional objects, features, and strengths of the present invention will be made clear by the description below. Further, the advantages of the present invention will be evident from the following explanation in reference to the drawings.

DESCRIPTION OF THE EMBODIMENTS

First Embodiment

The following describes one of the embodiments according to the present invention in reference to FIGS. 1 to 9.

Figure 2:
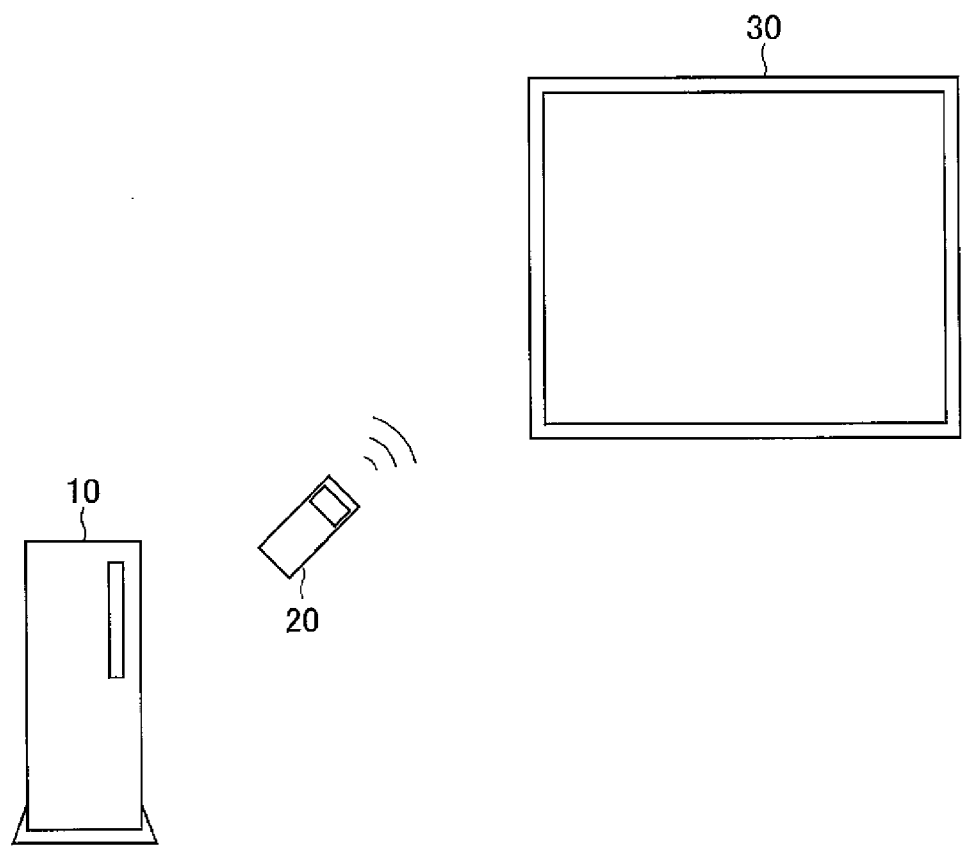
FIG. 2 is a view illustrating an example of a transmitting device according to the present invention.

Firstly, an embodiment of a transmitting system according to the present embodiment is described in reference to FIG. 2. FIG. 2 illustrates a case in which a data file stored in a host device 10 (such as a PC) is transmitted via a transmitting device 20 (such as a remote controller) to a display monitor 30: For example, the case in which the present invention is applied to a presentation tool. Needless to say, the present invention is not limited to the presentation tool, and other usage is also possible.

For example, it is also possible to apply the present invention to a transmitting device for transmitting a photo taken by a cellular phone or a digital camera to a TV or a photo printer.

In the system example described in FIG. 2, the host device 10 and the transmitting device 20 correspond to the transmitting system of the present invention. In this system, data transmission from the transmitting device 20 to the display monitor 30 is performed by using a one-way communication method such as a method using an IrSimple protocol.

Figure 1:
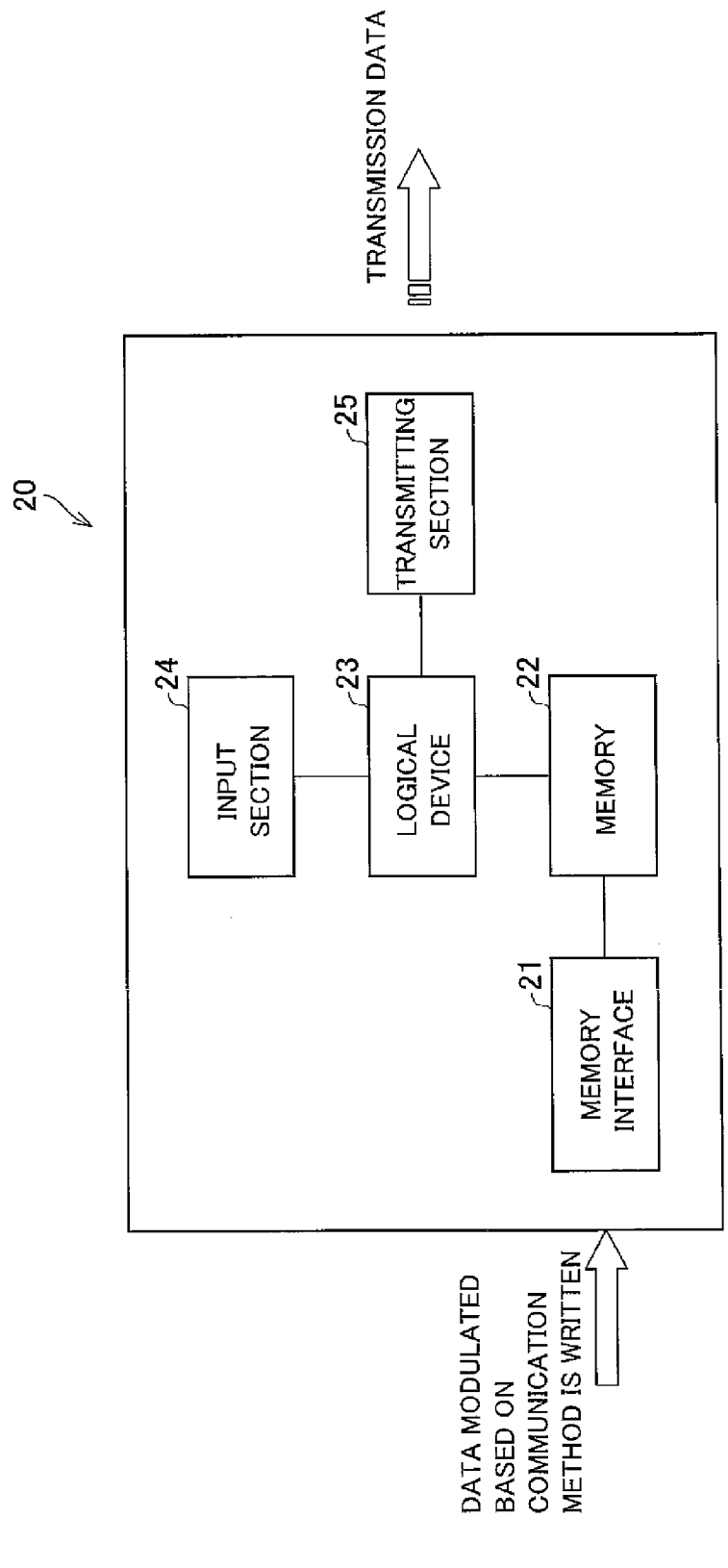
FIG. 1 shows an embodiment of the present invention and is a block diagram illustrating an arrangement of major parts in a transmitting device according to a first embodiment.

FIG. 1 is a block diagram illustrating an arrangement of main parts of the transmitting device 20 in the transmitting system shown in FIG. 2. The transmitting device 20 receives (i.e., copies) data from the host device 10 and transmits the data to the display monitor 30 (see FIG. 2). The transmission data to be transmitted to the display monitor 30 may be, but not limited to, text data, image data or the like, for example. The type of the transmission data is not particularly limited. The transmitting device 20 comprises a memory interface 21, a memory 22, a logical device 23, an input section 24, and a transmitting section 25.

The memory interface 21 has an interface function for the memory 22, such as an interface function of a USB or of a memory card. Through the memory interface 21, a user can write desired data (that the user wants to transmit to the display monitor 30) to the memory 22. Also, through the memory interface 21, the user can rewrite the transmission data to the memory 22 as many times as the user wants.

The memory 22 stores the data to be transmitted which has been written through the memory interface 21. The memory 22 may be a volatile memory (such as an SDRAM and the like) or a nonvolatile memory (such as a flash memory an HDD), a DVD and the like). In FIG. 1, the memory 22 is positioned inside the transmitting device 20, but the memory 22 should not necessarily be inside the transmitting device and may be connected to the transmitting device 20 as an external memory.

The logical device 23 reads out the data stored in the memory 22 according to a transmission command which is outputted from the input section 24, and then outputs the read data to the transmitting section 25. The logical device 23 may be a programmable logical device such as a PLD, an FPGA and the like, but it is not limited to these, and may be any device which is able to perform the foregoing function.

The input section 24 is, for example, a transmission button which is installed on the transmitting device 20 or the like. When the user presses the transmission button, the press of the button is detected and a transmission command is outputted to the logical device 23. The input section 24 here is the transmission button installed on the transmitting device, but the input section 24 may have a display section provided with a touch-panel function, so that the input section 24 may accept an input from the touch panel on the display section. Also, when an external device such as a PC or the like is connected, an input of a transmission request from the external device may be accepted directly. When the transmission button is pressed, the transmitting device 20 may transmit the transmission data in the memory 22 either once or more than once in succession.

The transmitting section 25 is a means for transmitting the transmission data which is read from the memory by the logical device 23. For example, when infrared rays are used as a communication medium, the transmitting section 25 will be an LED (Light Emitting Diode) or an LD (Laser Diode), but the type of the transmitting section 25 is not particularly limited. When other communication media are used, the transmitting section 25 will be the one which corresponds to the medium.

As described above, in the transmitting device 20, the user requests to transmit the desired transmission data by pressing the transmission button from the input section 24. Then, when the logical device 23 detects the transmission request from the input section 24, the desired transmission data stored in the memory 22 which is in the transmitting device or is connected externally to the transmitting device will be sequentially transmitted from the transmitting section 25.

In the arrangement of the transmitting device 20, the data transmission is performed in such a manner that the data stored in the memory 22 is read out and is directly transmitted through the transmitting section 25 without being converted. Therefore, protocol conversion based on a communication protocol of the transmission data and data modulation based on a communication method for the transmission data, each of which is conventionally performed in the transmitting device, should be performed, in advance, on the transmission data in the external device before the transmission data is stored in the memory 22.

In the transmitting system according to the present embodiment, the protocol conversion and the data modulation are performed by the host device 10.

The host device 10 stores data to be transmitted via the transmitting device 20 to the display monitor 30. The host device 10 comprises: a CPU as an operation part; and a memory for storing a program and data. A PC (Personal Computer) is preferably used as the host device 10, for example.

When the data is copied from the host device 10 to the transmitting device 20, the host device 10 performs the protocol conversion based on the communication protocol of the transmission data and the data modulation based on the communication method on the data to be written to the transmitting device 20 by using predetermined application software. Then, the data on which the protocol conversion and the data modulation have been done is written to the memory 22 of the transmitting device 20. The data may be directly written from the host device 10 to the transmitting device 20 by using a transmission medium such as a USB cable or the like, or may be through a recording medium such as a memory card or the like.

As described above, the transmitting system according to the present embodiment transmits the data file stored in the host device 10 via the transmitting device 20 such as a remote controller or the like to the display monitor 30. However, when the transmitting device 20 transmits the data to the display monitor 30, the transmitting device 20 does not perform the protocol conversion based on the communication protocol and the data modulation based on the communication method. Therefore, the transmitting device 20 can eliminate a CPU for the protocol conversion and a communication controller for the data modulation, each of which is essential for a conventional system. By this, a transmitting device for the one-way communication method can be attained at low cost.

In the transmitting system of the present invention, because the protocol conversion and the data modulation are not performed in the transmitting device 20, the protocol conversion and the data modulation are performed in the host device 10. In the host device 10, it is desirable that the protocol conversion and the data modulation are performed by application software. For example, when the host device 10 is a PC and the application software performs the protocol conversion and the data modulation, the user can use the transmitting system of the present invention only by installing the software to the PC. That is to say, by installing the program of the application software to the memory, the host device 10 attains both of the following functions for data to be written to the communication device 20 because of a linked operation between the CPU and the program stored in the memory: protocol conversion means for performing the protocol conversion based on the one-way communication protocol; and data modulation means for performing the data modulation based on the communication method according to the communication protocol. This also eliminates the need for adding the CPU for the protocol conversion or the communication controller for the data modulation to the host device 10.

Next, regarding a process for converting transmission data when the IrSimple protocol one-way communication is performed in the transmitting device of the present invention, the protocol conversion and the data modulation are described respectively.

[Protocol Conversion on Transmission Data]

Figure 3:
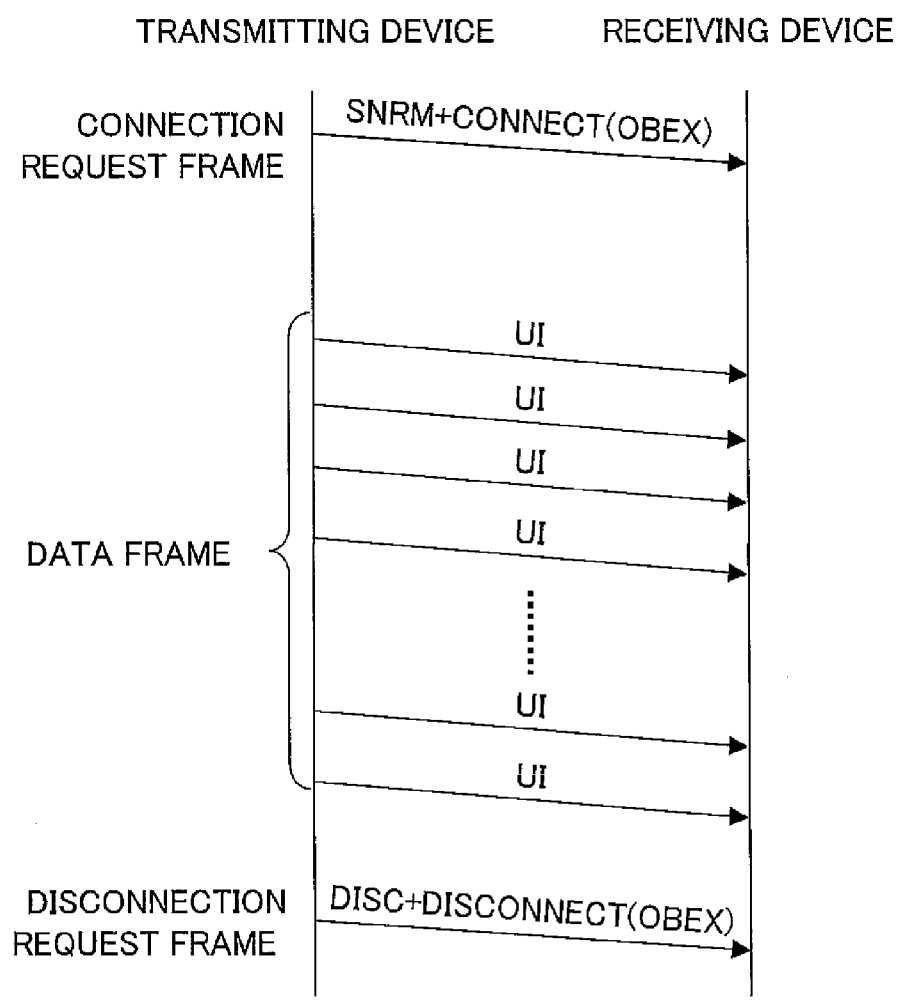
FIG. 3 is a view illustrating a communication sequence for an IrSimple one-way communication.

Firstly, the protocol conversion on transmission data is described. FIG. 3 shows a sequence chart of the IrSimple protocol one-way communication. In the IrSimple protocol one-way communication, after the transmitting device transmits a connection request frame to the receiving device, desired transmission data will be divided into data frames and then subsequently be transmitted. After all the data frames are transmitted, a disconnection request frame will be transmitted. Thus, the communication is completed without the need for data for a communication check from a communication recipient.

In the IrSimple protocol, the connection request frame is modulated based on the data modulation method which corresponds to an SIR communication method of 9600 bps. The data frame and the disconnection request frame are modulated based on the data modulation method which corresponds to the SIR communication method of a desired communication speed or to an FIR communication method of 4 Mbps.

[Data Modulation on Transmission Data]

Next, the data modulation on the transmission data is described. As described above, the data modulation is performed on the connection request frame, the data frame, and the disconnection request frame, each of which is created during the protocol conversion in the IrSimple one-way communication. The data modulation method described here is: the data modulation method of the SIR communication method which is the data modulation method for the IrSimple; and the data modulation method of the FIR communication method, but it is not limited to these. It is also possible to use other data modulation methods as long as the similar conversion to that based on the data modulation method of the SIR communication method or on the data modulation method of the FIR communication method is performed.

[Data Modulation Method of SIR Communication Method]

Figure 4:
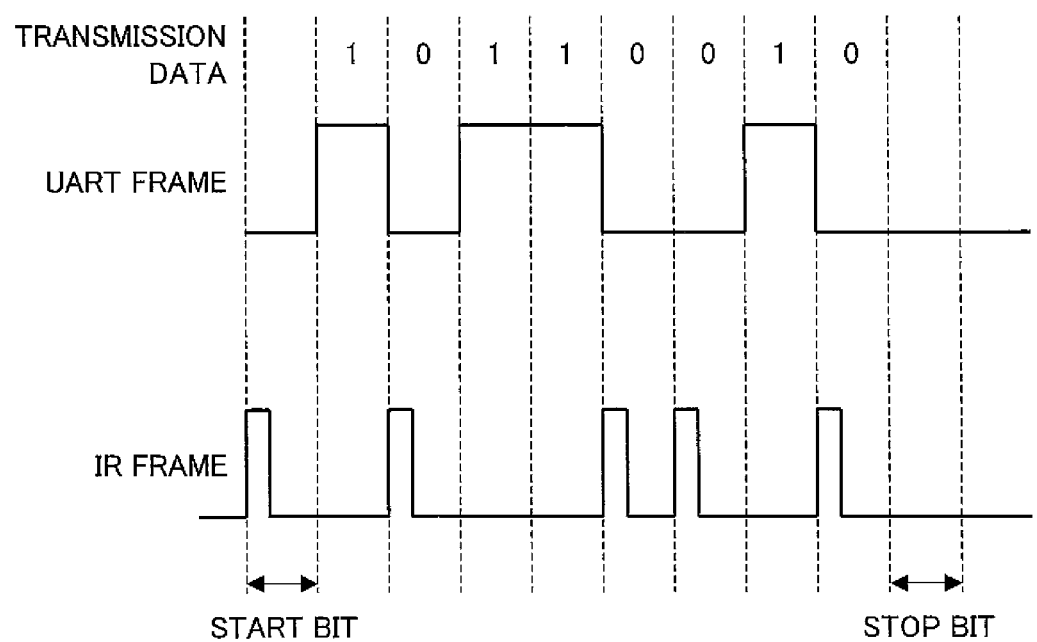
FIG. 4 is a view illustrating a modulation method of an SIR communication method.

FIG. 4 shows the data modulation method of the SIR communication method. In the data modulation method of the SIR communication method, at the step of serialization, a 1-bit start bit "0" and a 1-bit stop bit "1" are added to 1-byte transmission data. When a bit is "0" before the data modulation, the bit will be modulated to "1". When a bit is "1" before the data modulation, the bit will be modulated to "0". That is, as shown in FIG. 4, 1-byte transmission data "x4D" is modulated into a bit string "1010011010".

Figure 5:
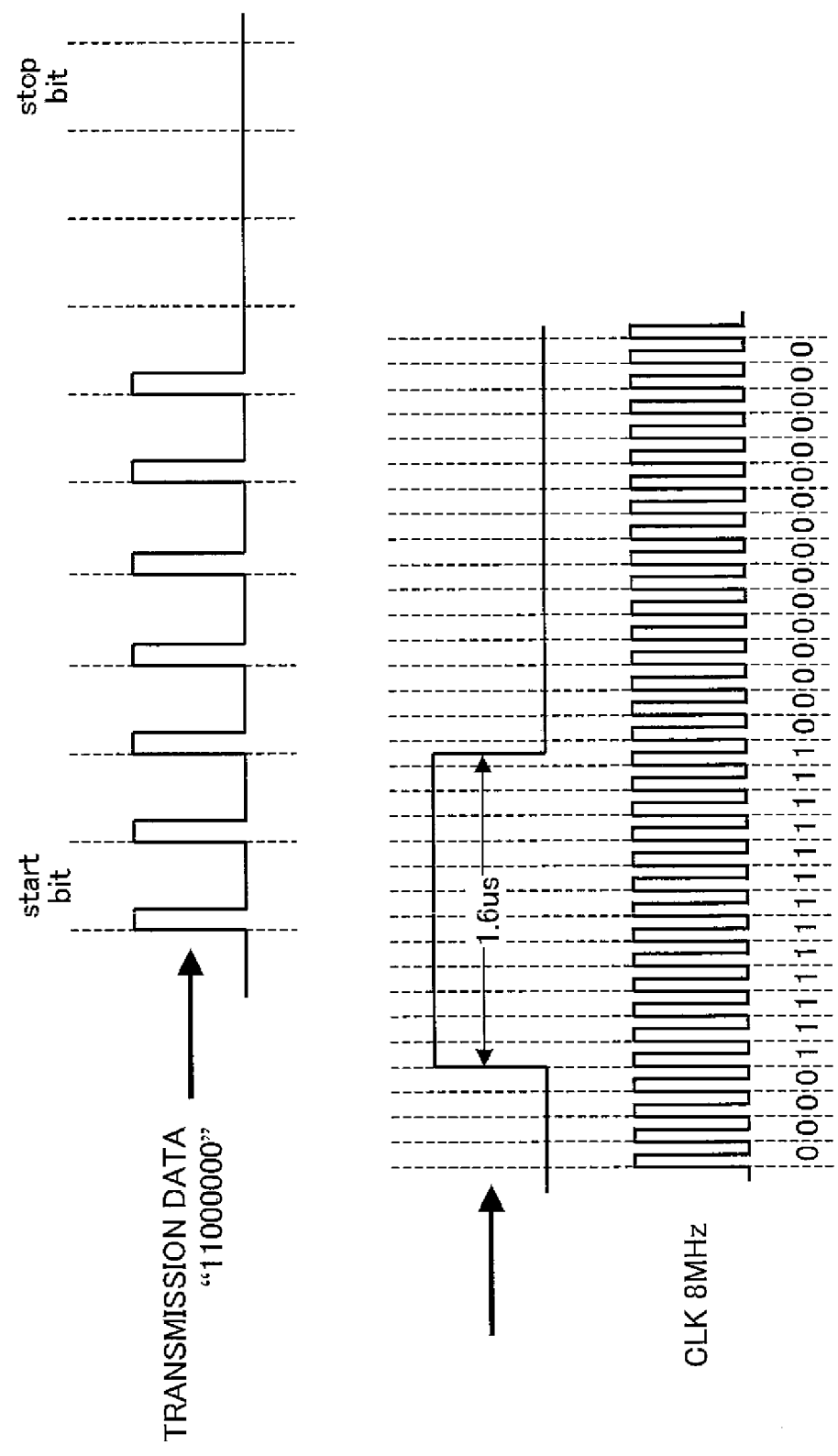
FIG. 5 is a view illustrating a process for converting transmission data of an SIR communication method into data to be written to a memory.

In the data modulation on the transmission data in the transmitting device of the present invention, as described in FIG. 5, a pulse (1.6 us in FIG. 5) of the SIR communication method is sampled by using a clock (for example, 8 MHz) which is equivalent to a standard clock for a read-out operation of the memory in the transmitting device or the memory which is connected externally to the transmitting device.

As shown in FIG. 5, when the 1.6-us pulse of the SIR communication method is sampled by using the 8-MHz clock, 13 leading edges of the clock will be included, and the 1.6-us pulse will be converted into "1111111111111".

Similarly, an area where no pulse exists is also sampled by using the 8-MHz clock, and is converted into data "0" depending on the number of leading edges of the clock.

[Data Modulation Method of FIR Communication Method]

Figure 6:
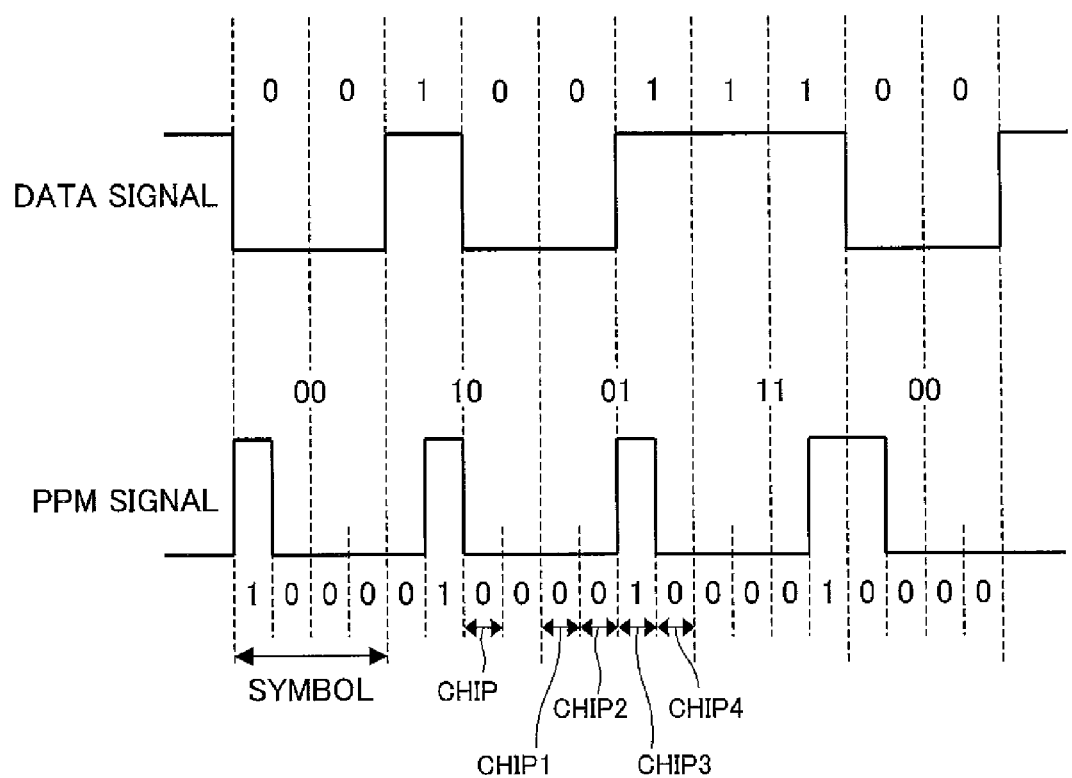
FIG. 6 is a view illustrating a 4PPM modulation, which is a modulation method of an FIR communication method.

Next, FIG. 6 shows the data modulation method of the FIR communication method. The FIR communication method employs the data modulation method which is called a 4PPM (Pulse Position Modulation) modulation.

FIG. 6 is a drawing illustrating a PPM signal which is obtained by performing the data modulation on a certain data signal based on the 4PPM modulation. In the data modulation process based on the 4PPM modulation, a desired transmission data signal is divided by the increment of 2 bits, and each 2-bit data signal is converted into the PPM signal in which a pulse of a chip specified depending on the value is risen. For convenience for description, the chip positions in one symbol period are denoted as follows from the front: Chip 1, Chip 2, Chip 3, and Chip 4. According to a predetermined conversion rule, a 2-bit data signal "00" is converted into a data modulation signal "1000", in which the pulse of Chip 1 is risen. A 2-bit data signal "10" is converted into a data modulation signal "0100", in which the pulse of Chip 2 is risen. A 2-bit data signal "01" is converted into a data modulation signal "0010", in which the pulse of Chip 3 is risen. A 2-bit data signal "11" is converted into a data modulation signal "0001", in which the pulse of Chip 4 is risen.

Figure 7:
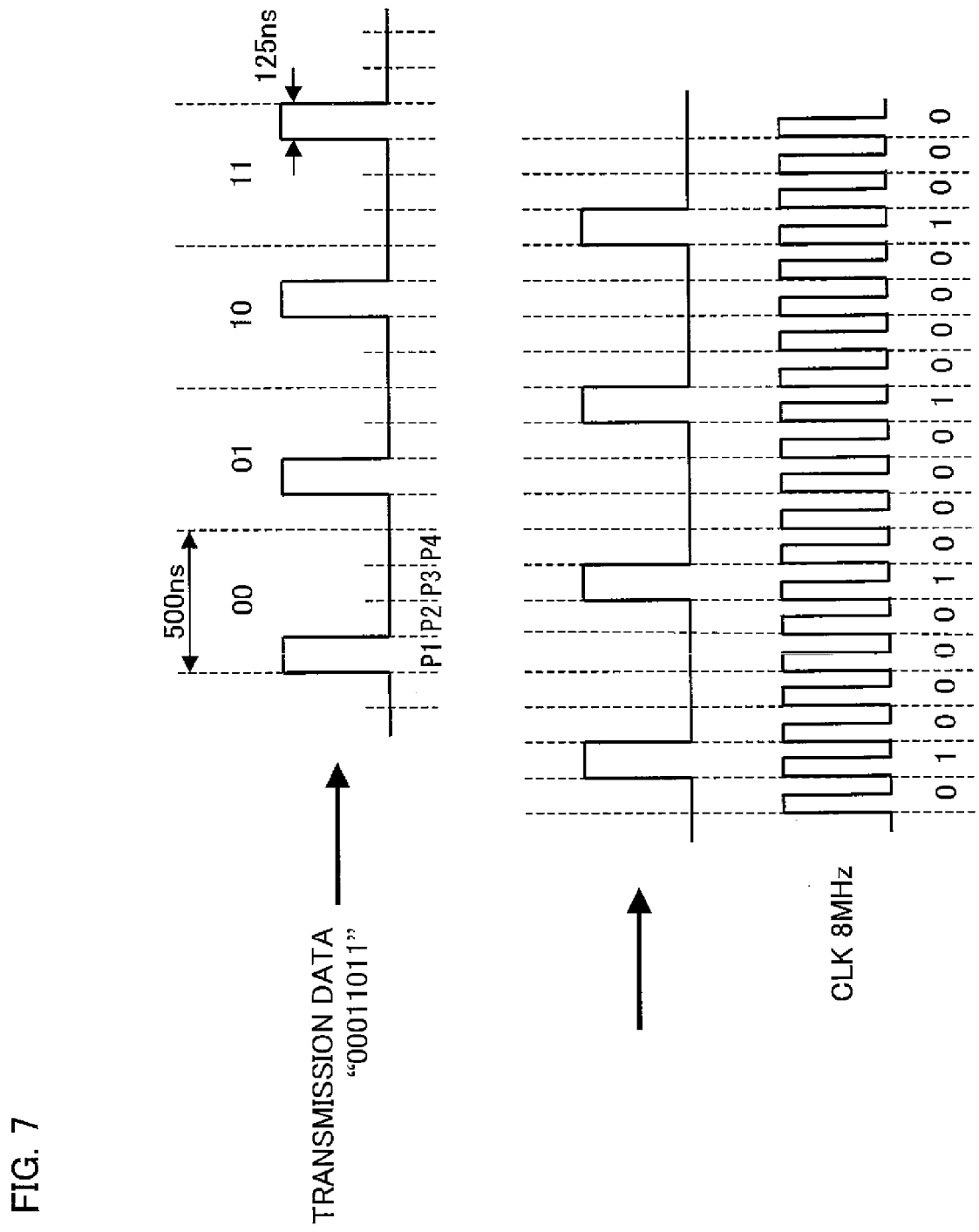
FIG. 7 is a view illustrating a process for converting transmission data of an FIR communication method into data to be written to a memory.

In the FIR communication method as described in FIG. 7, just as in the SIR communication method, a pulse (125 ns in the figure) of the FIR communication method is sampled by using the clock (for example, 8 MHz) which is equivalent to the standard clock for the read-out operation of the memory in the transmitting device or the memory which is connected externally to the transmitting device.

As shown in FIG. 7, when the 125-ns pulse of the FIR communication method is sampled by using the 8-MHz clock, just one leading edge of the clock will be included. Then, an area where the pulse of the FIR communication method exists is converted into data "1", and an area where no pulse exists is converted into data "0".

[Format of Transmission Data to be Written to Memory]

Figure 8:
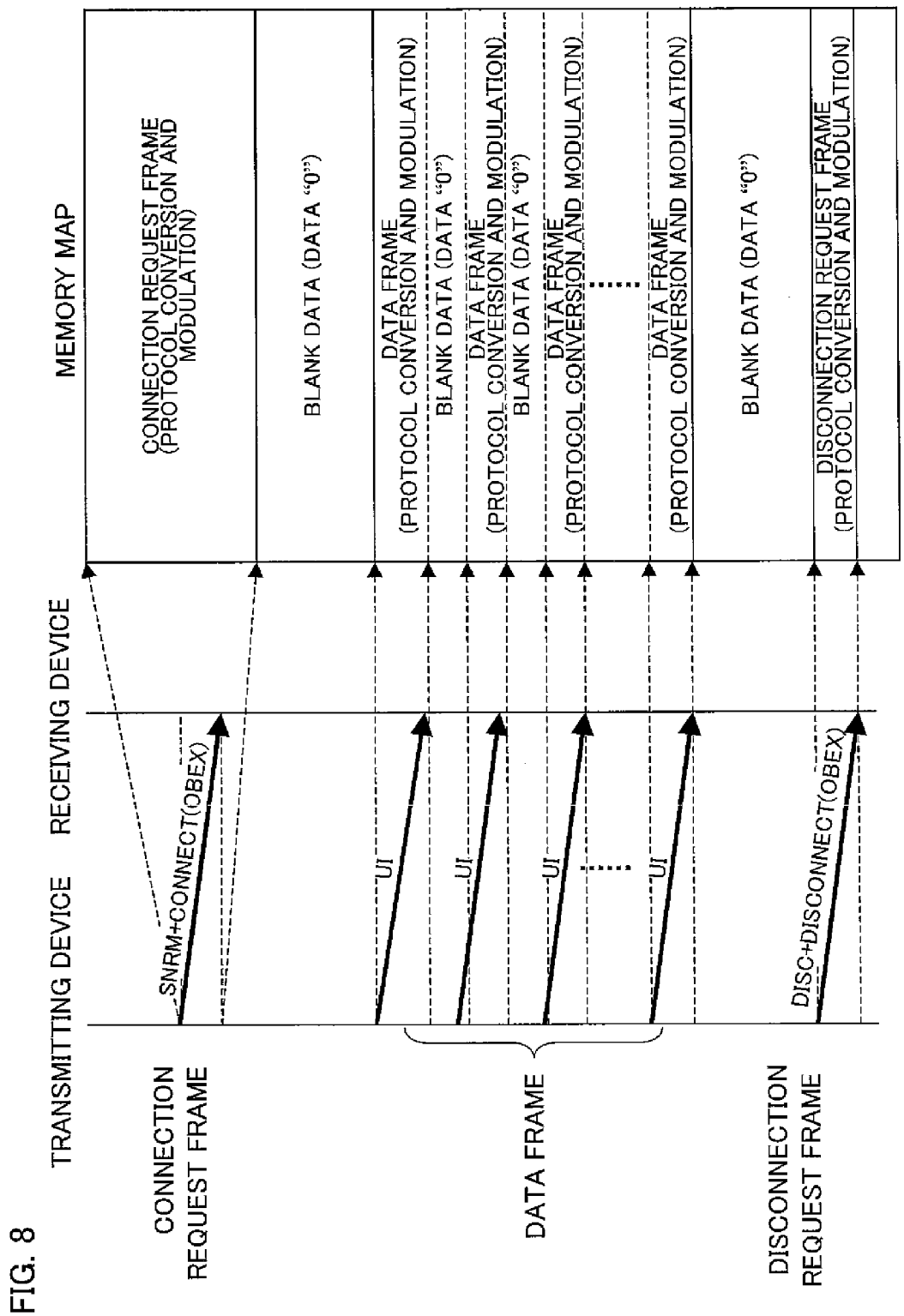
FIG. 8 is a view illustrating a memory map for transmission data in a transmitting device of the present invention.

When the data modulation is performed on all of the transmission frames based on the modulation method to which each transmission frame corresponds, the modulated data will be written to the memory in the transmitting device. FIG. 8 illustrates how the transmission data on which the protocol conversion based on the communication protocol and the data modulation have been done is arranged on the memory.

As shown in FIG. 8, the data on which the protocol conversion and the data modulation have been done is written from a transmission start address on the memory. Then, the connection request frame, the data frame, and the disconnection request frame will be arranged in order. In order to ensure intervals between the frames, data "0" is written between the frames depending on the frame intervals. With this arrangement, the transmitting device simply transmits the data after reading out the data in the order starting from the transmission start address.

At this point, in the transmitting device, the logical device reads out the transmission data from the memory by using the clock (which has the same clock frequency as the clock frequency assumed for the pulse sampling during the data modulation on the data written to the memory). Then, the data is outputted from the transmitting section.

[Flow of Transmission Data Conversion]

Figure 9:
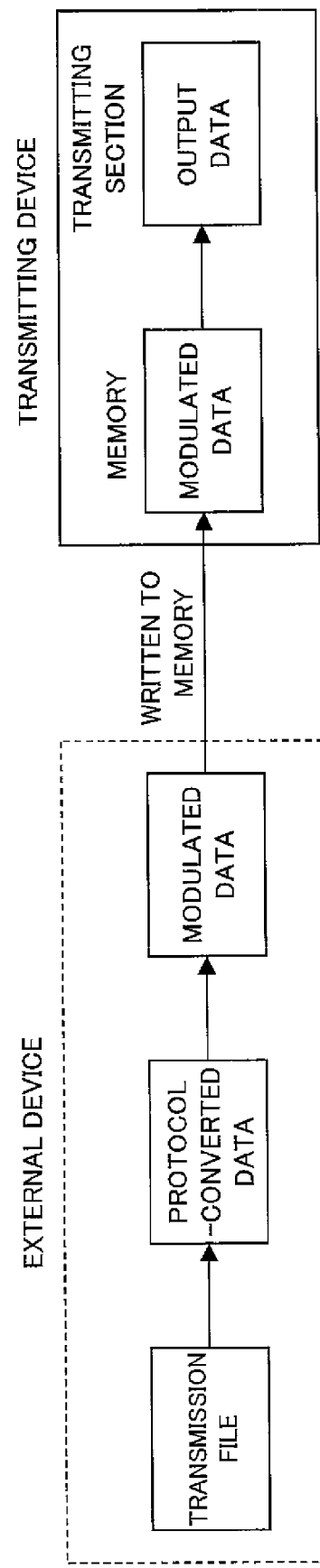
FIG. 9 is a view illustrating a conversion sequence for transmission data in a transmitting device according to the first embodiment.

Next, the conversion sequence for transmission data which is transmitted from the transmitting device is described in reference to FIG. 9.

For the transmitting device according to the present embodiment, desired transmission data such as image data, text data and the like is converted, in advance, by the external device (i.e., the host device 10 in FIG. 2). On the desired transmission data, the protocol conversion is performed based on the communication protocol with which the transmitting device is compatible. Furthermore, on the transmission data on which the communication protocol conversion has been done, the data modulation based on the communication method is performed.

The transmission data on which the protocol conversion and the data modulation have been done in the external device is written through the memory interface in the transmitting device to the memory in the transmitting device. When a transmission command is inputted by the user, the transmission data written to the memory is read out from the memory by the logical device in the transmitting device, and is outputted from the transmitting section directly.

Figure 13:
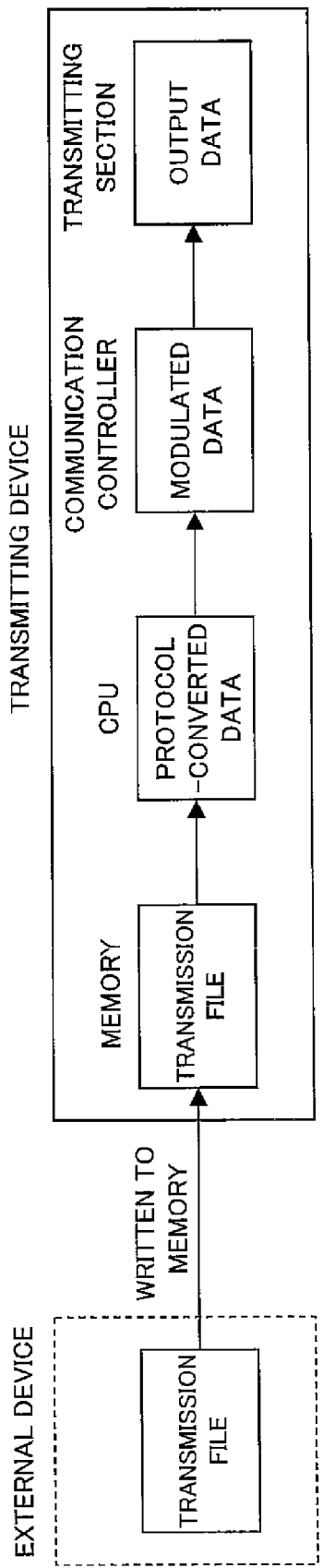
FIG. 13 is a view illustrating a conversion sequence for transmission data in a conventional transmitting device.

As described above, in the conversion sequence for the transmission data in the transmitting device according to the present embodiment, different from in the conversion sequence for the transmission data in a conventional device shown in FIG. 13, the followings are performed, in advance, on desired transmission data by the external device such as the PC or the like: the protocol conversion based on the communication protocol such as the IrSimple protocol; and the data modulation based on the data modulation method which corresponds to the communication method such as the IrSimple protocol. The converted data is stored in the memory in the transmitting device or the memory which is connected externally to the transmitting device.

As described above, the transmitting device 20 according to the present embodiment does not need the CPU or the communication controller, thereby making it possible to provide a transmitting device for the one-way communication at low cost. As the usage of the transmitting device, for example, the followings are considered: a presentation data transmitting tool; a simple transmitting device for an operation check of a receiving device.

Second Embodiment

Figure 10:
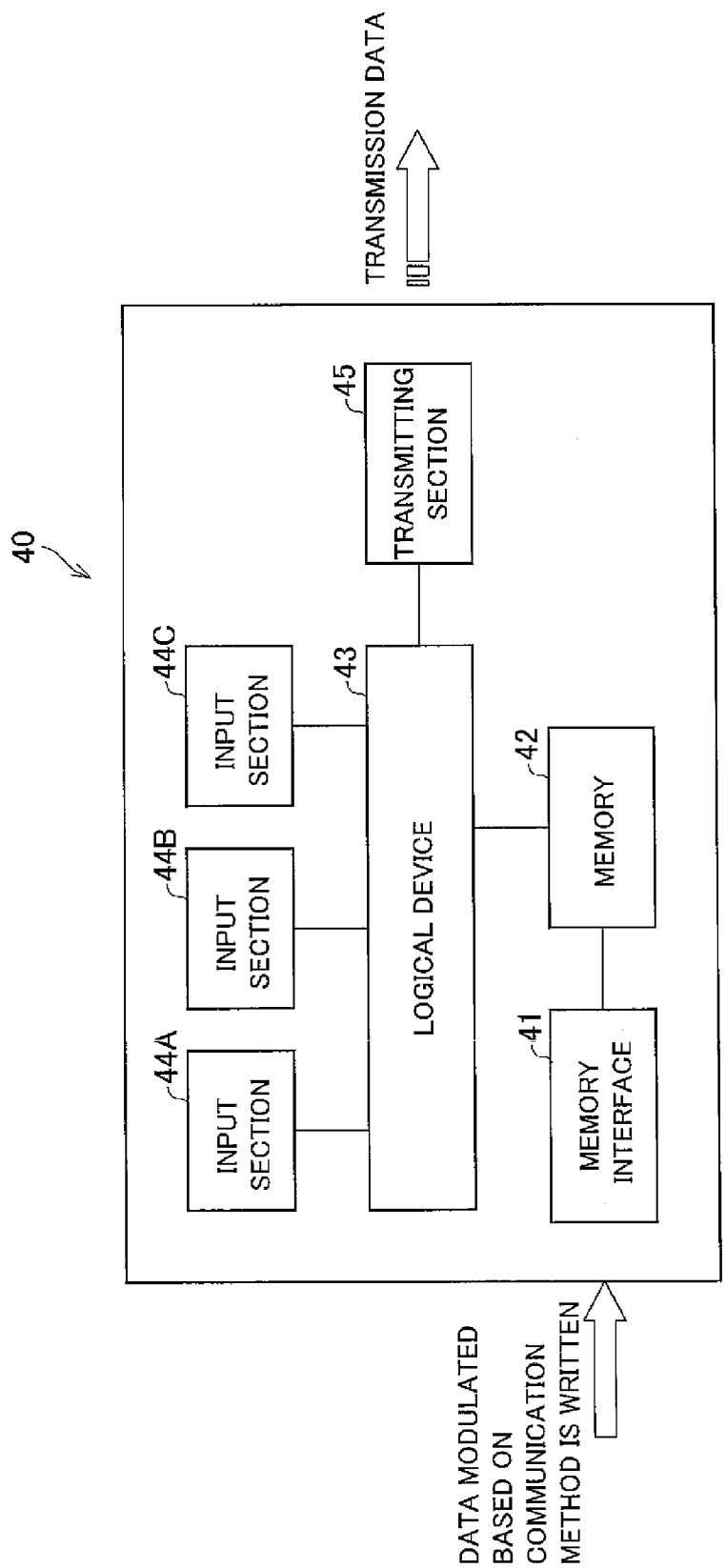
FIG. 10 is a block diagram illustrating an arrangement of major parts in a transmitting device according to a second embodiment.
Figure 11:
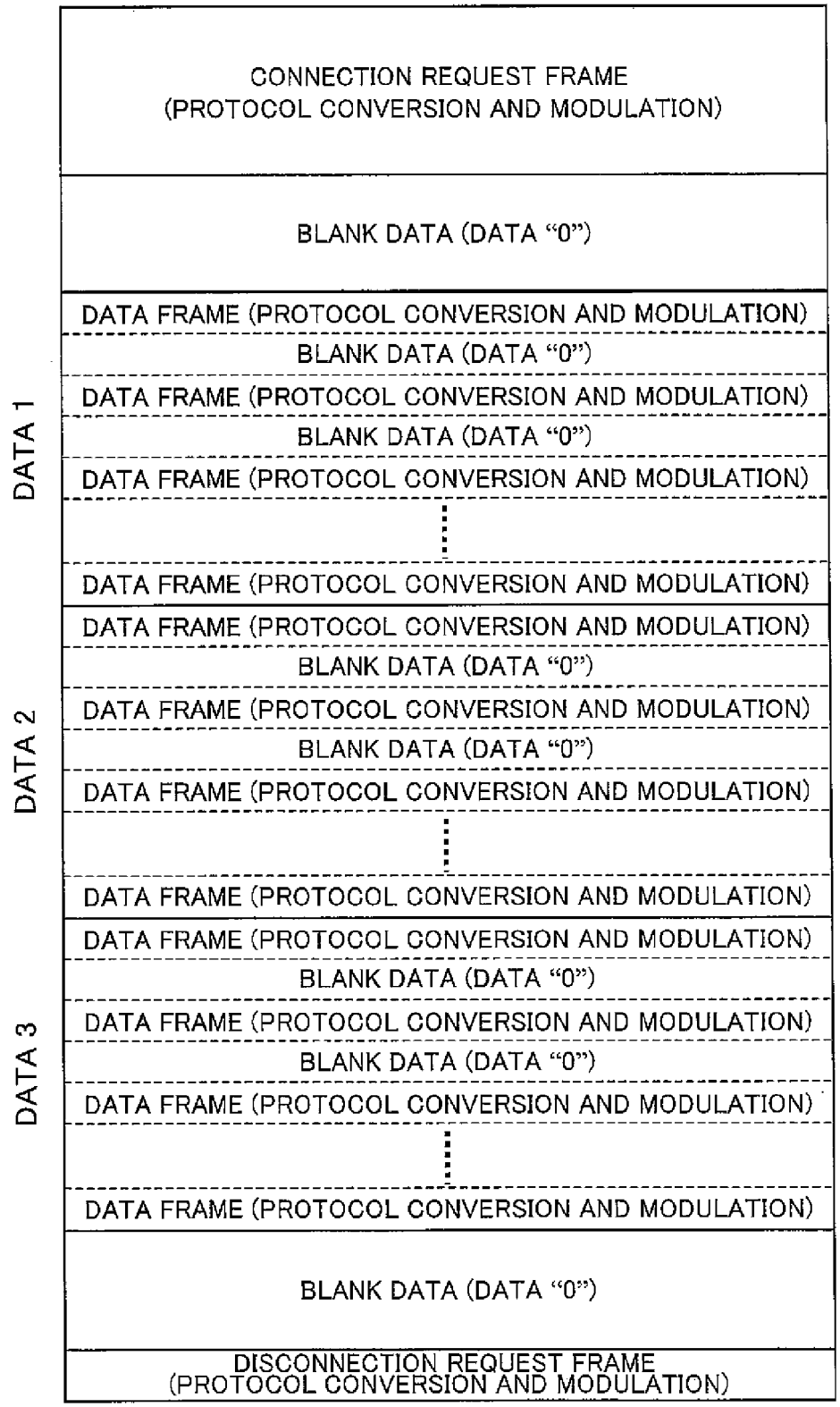
FIG. 11 is a view illustrating a memory map when a transmitting device of the present invention transmits plural files.
Figure 12:
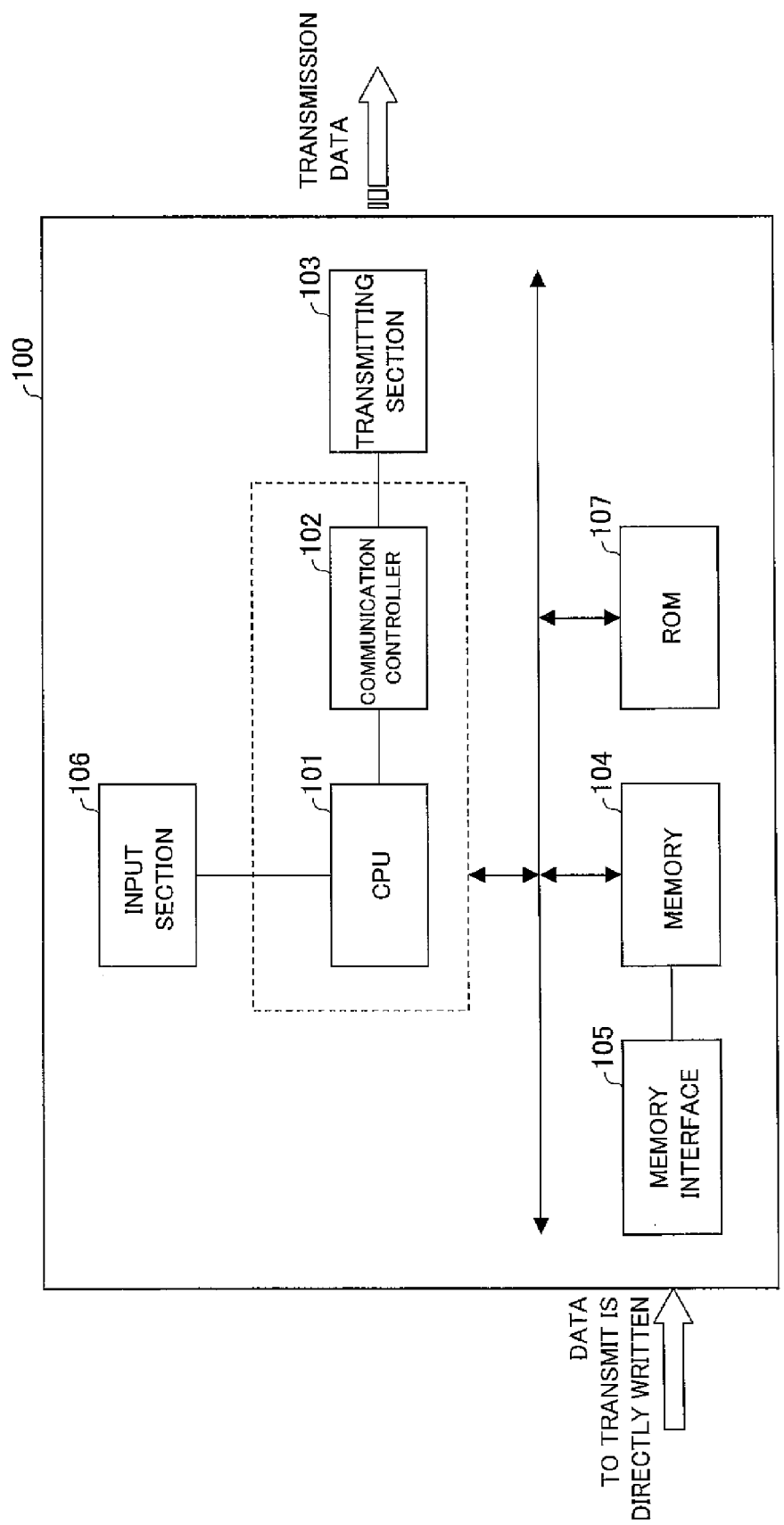
FIG. 12 is a block diagram illustrating an arrangement of major parts in a conventional transmitting device.

The following describes another embodiment according to the present invention in reference to FIG. 10 and FIG. 11.

In the second embodiment, the following case is described: In addition to the functions of the transmitting device according to the first embodiment, functions for selecting and transmitting plural pieces of transmission data are added. Firstly, a transmitting device according to the second embodiment is described in reference to FIG. 10.

Instead of the transmitting device 20, a transmitting device 40 shown in FIG. 10 can be used in the transmitting system in FIG. 2. That is, the transmitting device 40 receives (i.e., copies) data from the host device 10 and transmits the data to the display monitor 30 (see FIG. 2). The transmission data which is transmitted to the display monitor 30 includes, for example, text data, image data and the like, but the type of the transmission data is not particularly limited.

The transmitting device 40 comprises a memory interface 41, a memory 42, a logical device 43, input sections 44A to 44C, and a transmitting section 45. The detailed descriptions for each block are equal to the functions described in the first embodiment. Therefore, the detailed descriptions are omitted here.

The transmitting device 40 according to the second embodiment differs from the transmitting device 20 according to the first embodiment in the point that the transmitting device 40 has the plural input sections 44A to 44C. In the transmitting device 40, the plural pieces of transmission data are arranged in the memory 42 in the transmitting device as shown in FIG. 11. However, this data arrangement is one example, and the present invention is not limited to this.

Each piece of the transmission data has the connection request frame and the disconnection request frame in common. Each of the transmission files on which the protocol conversion and the data modulation have been done by the host device 10 is arranged on the memory. In the transmitting device 40, the plural input sections 44A to 44C respond to the plural pieces of transmission data, and a data reading address for reading out data from the memory is changed depending on a transmission request inputted from the plural input sections.

With this arrangement, the transmitting device 40 can select and transmit plural pieces of transmission data.

Third Embodiment

Figure 14:
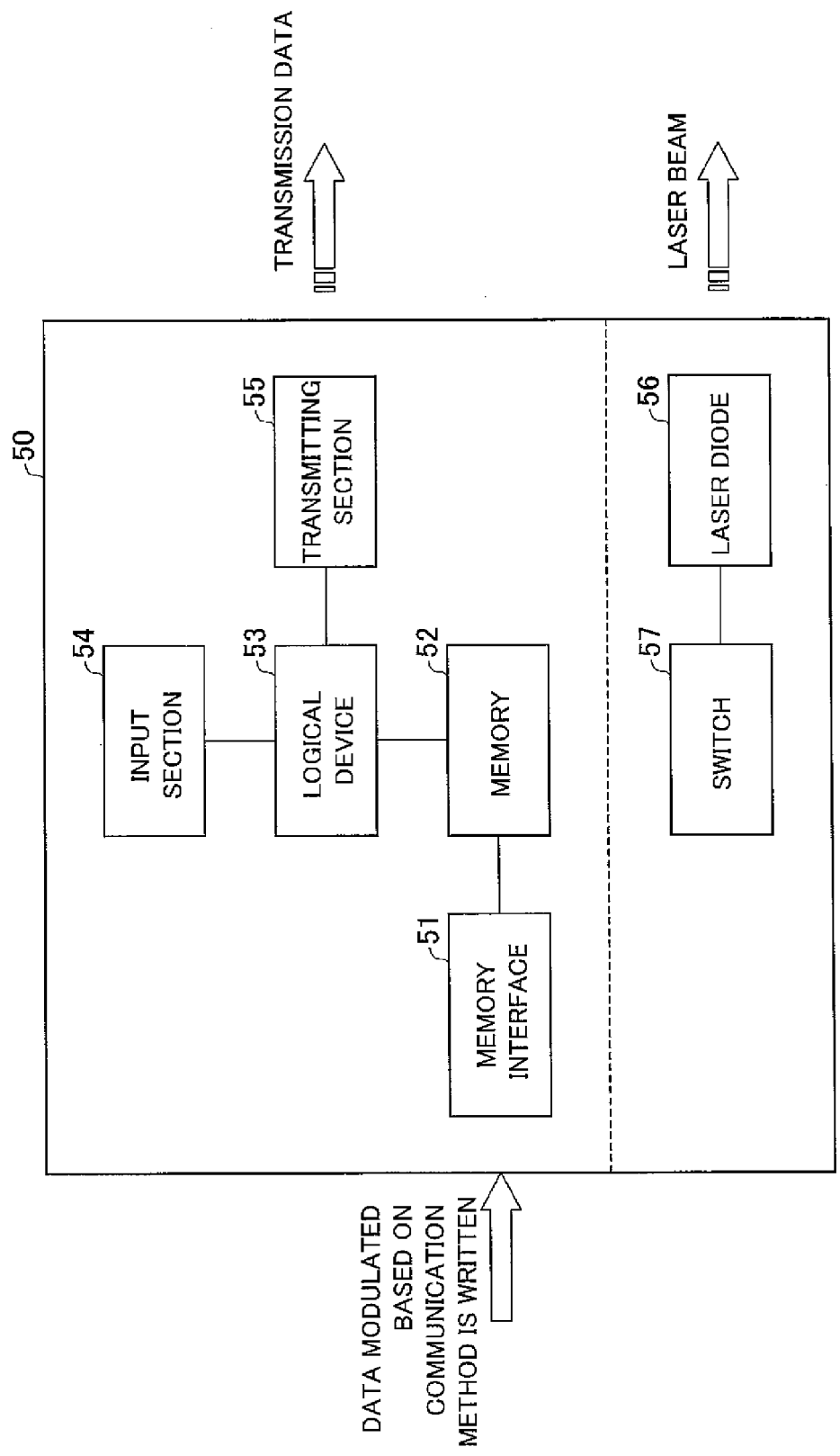
FIG. 14 is a block diagram illustrating an arrangement of major parts in a transmitting device according to a third embodiment.
Figure 15:
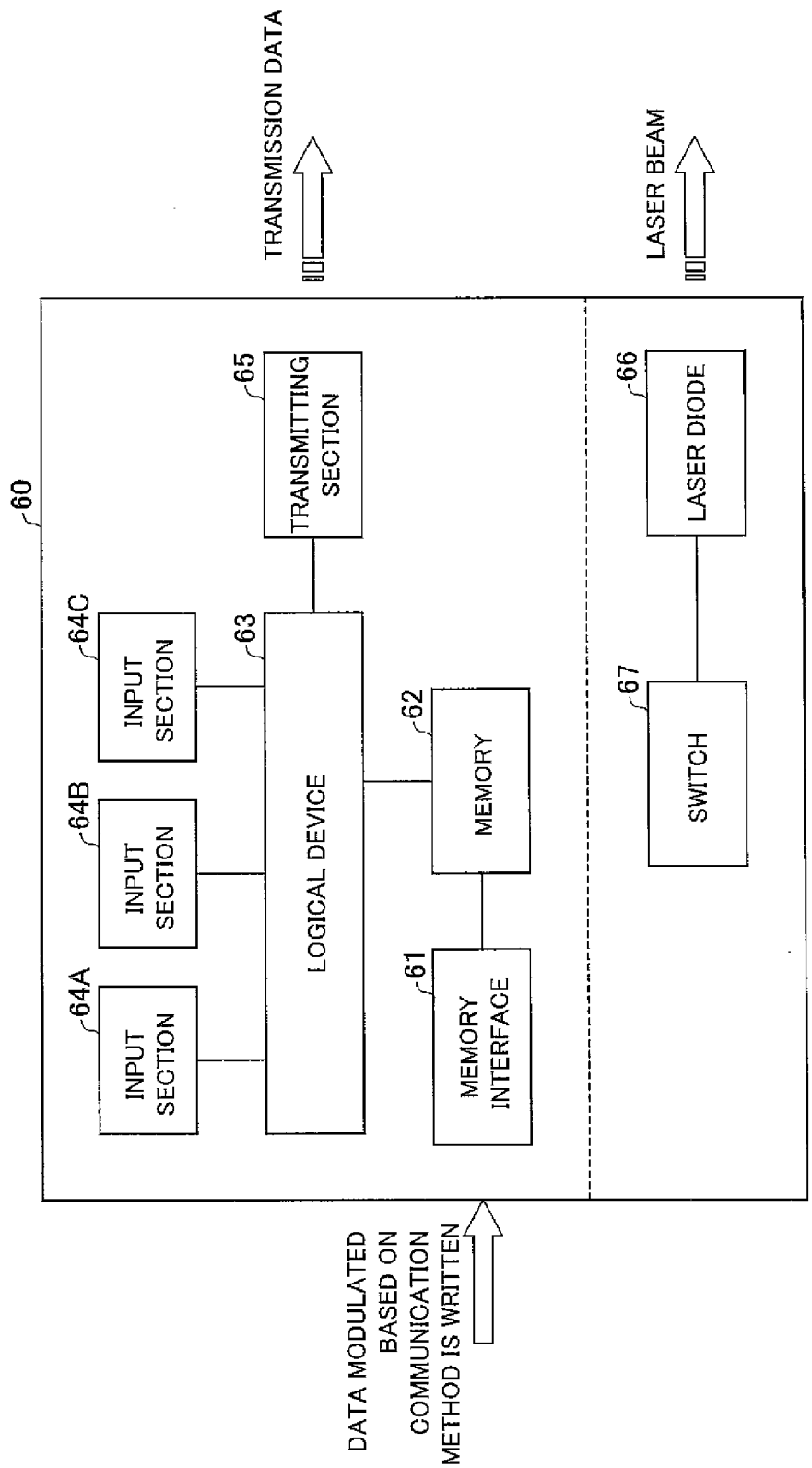
FIG. 15 is a block diagram illustrating an arrangement of major parts in a transmitting device according to the third embodiment.

The following describes yet another embodiment according to the present invention in reference to FIG. 14 and FIG. 15.

In the third embodiment, the following case is described: When the transmitting device of the present invention is applied to a presentation tool, which is a preferable example, a laser pointer function is added to the transmitting device in addition to the functions of the transmitting device according to the first embodiment and the second embodiment. The term "laser pointer" here means a small device which uses a laser beam and is used for a lecture meeting and the like instead of a pointer stick. Firstly, the transmitting device according to the third embodiment is described in reference to FIG. 14 or FIG. 15. Needless to say, functions which can be added to the transmitting device of the present invention are not limited to the laser pointer function described here.

A transmitting device 50 shown in FIG. 14 or a transmitting device 60 shown in FIG. 15 can be used instead of the transmitting device 20 in the transmitting system described in FIG. 2. That is, the transmitting device 50 or the transmitting device 60 receives (i.e., copies) data from the host device 10 (such as a laptop computer), and then transmits the data to the display monitor 30 (see FIG. 2) such as a projector. The transmission data which is transmitted to the display monitor 30 includes, for example, image data, text data and the like for a presentation, but the type of the transmission data is not particularly limited. A presenter operates an input key on the transmitting device, so as to copy predetermined data from the host device (such as a laptop computer) compatible with the transmitting/receiving system of the device to the transmitting device having the laser pointer function of the present invention, and to transmit the copied data from the transmitting device having the laser pointer function to the projector. As a result, the required display information is sent from the transmitting device having the laser pointer function to the projector and then is displayed. This allows the presenter to point out the indicated display by a laser beam of the laser pointer while the presenter is giving an explanation, thereby making the audience gain a better comprehension. It is possible to transmit video and the like as well as slideshow data.

Because the transmitting/receiving device of the present invention does not need the CPU, the transmitting/receiving device can be integrated into a small device such as the laser pointer which can be held by the user's hand and operated.

The transmitting device 50 is equivalent to the transmitting device 20 according to the first embodiment to which the laser pointer function is added.

The transmitting device 50 comprises a memory interface 51, a memory 52, a logical device 53, an input section 54, a transmitting section 55, a laser diode 56, and a switch 57. The detailed descriptions for each block except for the laser diode 56 and the switch 57 are equal to the functions described in the first embodiment. Therefore, the detailed descriptions are omitted here.

The laser diode 56 is for emitting a laser beam when the switch 57 is pressed. The switch 57 is pressed to emit a laser beam. The transmitting device 50 according to the third embodiment differs from the transmitting device according to the first embodiment in the point that the transmitting device 50 has the laser diode 56 and the switch 57.

The transmitting device 60 is equivalent to the transmitting device according to the second embodiment to which the laser pointer function is added.

The transmitting device 60 comprises a memory interface 61, a memory 62, a logical device 63, input sections 64A to 64C, a transmitting section 65, a laser diode 66, and a switch 67. The detailed descriptions for each block are equal to the functions described in the second embodiment. Therefore, the detailed descriptions are omitted here.

The transmitting device 60 according to the third embodiment differs from the transmitting device 40 according to the second embodiment in the point that the transmitting device 60 has the laser diode 66 and the switch 67.

With this arrangement, the transmitting device 50 or the transmitting device 60 can provide a presentation tool to which the laser pointer function is added. The transmitting device 50 or the transmitting device 60 makes it possible to perform the followings at very low cost and by using one small device when the user gives a presentation: transmitting presentation materials; and pointing out a drawing and the like by the laser pointer.

The foregoing description illustrates the case in which the transmitting device according to the present embodiment is compatible with the IrSimple one-way communication, but the present invention is not limited to this. It is needless to say that the present invention can be applied even to a transmitting device which is compatible with other one-way communication methods.

The foregoing processing functions (that is to say the protocol conversion processing and the data modulation processing) in the host device are implemented by a program. In the present embodiment, this program is stored in a computer-readable storage medium.

In the present embodiment, the storage medium may be: a program media such as RAM which is a memory required for performing processing in a computer; and a storage medium which can be freely attached to/detached from the external storage device of the computer and whose storing program can be read out via the external storage device. The external storage device may be a magnetic tape device, an FD drive, a CD-ROM drive and the like (not illustrated). The storage medium may be magnetic tape, an FD, a CD-ROM and the like (not illustrated). In any case, the program stored in respective storage media may be accessed to and implemented by the CPU; or the program may be once read out to be loaded to a predetermined program storage area such as a program storage area in the RAM, and then be read out again and implemented by the CPU. The program for loading should be stored in the computer in advance.

The storage medium is removable from the computer body here. For the storage medium, a medium which supports a program in a fixed manner is applicable. More specifically, the followings are applicable: tape such as magnetic tape, cassette tape and the like; a magnetic disc such as an FD, a fixed disc and the like; an optical disc such as a CD-ROM, an MO (Magnetic Optical Disc), an MD (Mini Disc), a DVD (Digital Versatile Disc) and the like; a card such as an IC card (including a memory card), an optical card and the like; and a semi-conductor memory such as a mask ROM, an EPROM (Erasable and Programmable ROM), an EEPROM (Electrically EPROM), a flash ROM and the like. Also, a storage medium is applicable, which holds the program in a flowing manner in which the program is downloaded from a communication network. In the arrangement in which the program downloaded from the communication network is used, the program for downloading may be stored in the computer in advance or may be installed to the computer from the other storage medium in advance.

As described above, a transmitting system according to the present invention comprises a host device and a transmitting device, for transmitting data stored in the host device via the transmitting device to a receiving device by using a one-way communication method, the transmitting device comprising: a memory to which desired transmission data is written from the host device; a logical device for reading the data out of the memory and outputting the read data to a transmitting section so as to transmit, to the receiving device, the transmission data stored in the memory; and the transmitting section for transmitting the data read from the memory to the receiving device, wherein on the transmission data to be written to the memory in the transmitting device, the host device performs protocol conversion based on a one-way communication protocol and data modulation based on a communication method according to the communication protocol.

With this arrangement, desired transmission data such as image data, text data and the like is converted, in advance, by the host device, which is the external device such as the PC or the like. On the desired transmission data, the protocol conversion is performed based on the communication protocol with which the transmitting device is compatible. Then, on the transmission data on which the communication protocol has been converted, the data modulation is performed based on the communication method.

The transmission data on which the protocol conversion and the data modulation have been done by the host device is written to the memory in the transmitting device. When a transmission command is inputted by the user, the transmission data written to the memory will be read from the memory by the logical device in the transmitting device, and then the transmission data will be transmitted as such.

As a result, the transmitting system does not need the CPU for performing the protocol conversion or the communication controller for performing the data modulation, thereby making it possible to provide a transmitting device at low cost which corresponds to the one-way communication.

The transmitting system is preferably arranged such that the host device performs the protocol conversion and the data modulation by using application software.

With this arrangement, when the host device is, for example, a PC and the protocol conversion and the data modulation are performed by the software, the user can use the transmitting system according to the present invention only by installing the software to the PC. In addition, this eliminates the need for adding the CPU for the protocol conversion and the communication controller for the data modulation to the host device.

Moreover, the transmitting system may be arranged such that the host device is capable of writing transmission data to the memory, the transmission data comprising data on which the data modulation compatible with plural communication methods has been performed.

The host device may be capable of writing, to the memory, a transmission file having a plural pieces of transmission data on which the protocol conversion based on the one-way communication protocol and the data modulation based on the communication method according to the communication protocol have been done.

Furthermore, the transmitting system may be arranged such that the communication protocol and the communication method are a communication protocol and a communication method according to an IrSimple one-way communication.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A transmitting system comprising a host device and a transmitting device that is directly operated by a user, for transmitting, to a display or printing device via the transmitting device by using a one-way communication method based on a particular communication standard, data for display or printing which is stored in the host device, the transmitting device that is directly operated by the user comprising:
a memory to which the data for display or printing which has been subjected, by the host device in advance, to protocol conversion based on a communication protocol of the data and data modulation based on a communication method for the data, is written from the host device;
a logical device for reading the converted and modulated data for display or printing out of the memory and outputting the read converted and modulated data for display or printing to a transmitting section without performing protocol conversion and data modulation, so as to transmit, to the display or printing device, the converted and modulated data for display or printing stored in the memory; and
the transmitting section for transmitting, to the display or printing device, the converted and modulated data for display or printing which is read from the memory, without performing the protocol conversion and the data modulation in the transmitting device,
wherein on the converted and modulated data for display or printing to be written to the memory in the transmitting device, the host device performs the protocol conversion based on a one-way communication protocol.

2. The transmitting system as set forth in claim 1, wherein the host device performs the protocol conversion and the data modulation by using application software.

3. The transmitting system as set forth in claim 1, wherein the host device is capable of writing data for display or printing to the memory, the data for display or printing comprising data on which the data modulation compatible with plural communication methods has been performed.

4. The transmitting system as set forth in claim 1, wherein the host device is capable of writing, to the memory, a transmission file having a plural pieces of data for display or printing on which the protocol conversion based on the one-way communication protocol and the data modulation based on the communication method according to the communication protocol have been done.

5. The transmitting system as set forth in claim 1, wherein the communication protocol and the communication method are a communication protocol and a communication method according to an IrSimple one-way communication.

6. A transmitting device, that is directly operated by a user, for use in a transmitting system comprising a host device and a transmitting device, and for transmitting, to a display or printing device by using a one-way communication method based on a particular communication standard, data for display or printing which is stored in the host device, the transmitting device that is directly operated by the user comprising:
a memory to which the data for display or printing which has been subjected, by the host device in advance, to protocol conversion based on a communication protocol of data and data modulation based on a communication method for the data, is written from the host device;
a logical device for reading the converted and modulated data for display or printing out of the memory and outputting the read converted and modulated data for display or printing to a transmitting section without performing protocol conversion and data modulation, so as to transmit, to the display or printing device, the converted and modulated data for display or printing stored in the memory; and
the transmitting section for transmitting, to the display or printing device, the converted and modulated data for display or printing which is read from the memory, without performing the protocol conversion and the data modulation in the transmitting device.

7. A transmitting system comprising a host device and a transmitting device that is directly operated by a user and in which data for display or printing which is stored in the host device is transmitted via the transmitting device to a display or printing device by using a one-way communication method based on a particular communication standard, the host device comprising:
protocol conversion means for performing, based on the one-way communication protocol, protocol conversion on the stored data for display or printing which is to be transmitted; and
data modulating means for performing, based on a communication method according to the communication protocol, data modulation on the stored data for display or printing which is to be transmitted; and
the transmitting device that is directly operated by the user comprising:
a memory to which desired the data for display or printing which has been subjected, by the host device in advance, to the protocol conversion based on a communication protocol of data and the data modulation based on a communication method for the data, is written from the host device;

a logical device for reading the converted and modulated data for display or printing out of the memory and outputting the read converted and modulated data for display or printing to a transmitting section without performing protocol conversion or and data modulation, so as to transmit, to the display or printing device, the converted and modulated data for display or printing stored in the memory; and the transmitting section for transmitting, to the display or printing device, the converted and modulated data for display or printing which is read from the memory, without performing the protocol conversion and the data modulation in the transmitting device.

8. A storage medium that stores a data processing program for causing a host device as set forth in claim 7 to operate, wherein the data processing program causes a computer to function as each means.

* * * * *